Patented Mar. 3, 1942

2,275,124

UNITED STATES PATENT OFFICE 2,275,124

AZO DYE

Frithjof Zwilgmeyer, Wilmington, Del., assignor to E. I. du Pont de Nemours & Company, Wilmington, Del., a corporation of Delaware No Drawing. Application December 6, 1940,
Serial No. 368,843

2 Claims. (Cl. 260—204)

This invention relates to a new compound being an azo dyestuff of exceptional properties.

The object of the invention is to prepare an azo dyestuff, red violet in color, which is suitable for the coloring of textiles, particularly by printing and development on the fiber.

The objects of the invention are accomplished by the dyestuff represented by the formula:

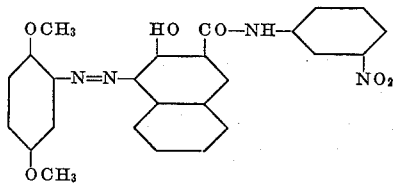

whose properties of fastness to washing and light are exceptional when compared with other azo colors having a similar shade.

The color is preferably applied to the material by stabilizing the diazo salt, by coupling to a stabilizer such as diethanol amine, or any other stabilizer which can be split off by acid, and incorporating the stabilized diazo salt in a printing paste containing the 3'-nitro-anilide of 2-hydroxy-3-naphthoic acid. The components of the printing paste may otherwise conform to the good practice of the prior art. The reactants are incorporated in the paste in approximately equal molecular proportions, applied to the fiber by a printing roller or otherwise, and developed by exposure to acid fumes, such as the fumes of dilute acetic acid.

The following examples are illustrative of the invention but are not intended to limit it beyond the scope of the appended claims.

EXAMPLE I

A printing paste was prepared according to the following formula:

| | Parts |
|---|---|
| Diazoamino compound obtained by the action of diazotized 2,5-dimethoxy-aniline on diethanolamine | 1.9 |
| 3'-nitro-anilide of 2,3-hydroxy-naphthoic acid | 2.1 |
| Mono-ethyl-ether of ethylene-glycol | 4.0 |
| Water | 24.0 |
| Sodium hydroxide solution (30%) | 3.0 |
| Thickener made up according to the formula below | 65.0 |
| | 100.0 |

Thickener

| | Parts |
|---|---|
| Wheat starch | 60 |
| Water | 580 |
| Tragacanth 6% | 360 |
| | 1000 |

Cotton and rayon piece goods were printed on an engraved roller with the above printing paste. The printed fabric thus obtained was dried in air and then subjected to the action of live steam containing the vapors of acetic acid. A color development took place and the printed goods were rinsed with water, boiled for five minutes in an 0.5% soap solution, again rinsed, and dried. A deep red-violet dyeing of good fastness properties was obtained.

EXAMPLE II 30.8 g. (0.1) of N-(2'-hydroxy-3'-naphthoyl)-3-nitro-aniline was slurried with
80.0 cc. of ethyl alcohol, and dissolved by the addition of
6.4 g. (0.16 mol) of sodium hydroxide as 80 cc. of a 2-normal solution in water. This solution was cooled to below 10° C. by the addition of ice.
15.3 g. (0.1 mol) of 2,5-dimethoxy-aniline was diazotized with hydrochloric acid and sodium nitrite solutions in the manner well known to the art, and the resulting diazo solution was clarified and run slowly with agitation into the alkaline solution of the coupling component.

The red-violet pigment which separated was isolated by filtration, washed well with water, and dried.

The above examples illustrate the usual methods of preparing the dyestuff, and Example I describes the customary manner of applying the dye to cellulosic fibers. The dye finds its most important use in printing where the stabilized diazo component in mixture with the coupling component is printed on the fiber and developed by hydrolysis of the diazoamino compound. As described above, this color combination can be prepared in substance as well as on the fiber, or it may be temporarily solubilized, applied to the fiber, and desolubilized thereon.

As many apparently widely different embodiments of this invention may be made without departing from the spirit and scope thereof, it is to be understood that I do not limit myself to the specific embodiments thereof except as defined in the appended claims.

I claim:

1. The compound represented by the formula:

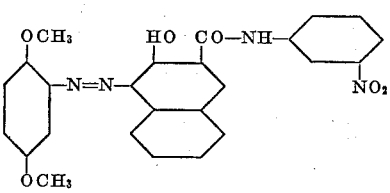

2. The process which comprises reacting diazotized 2:5-dimethoxy aniline with the 3'-nitro-anilide of 2-hydroxy-3-naphthoic acid.

FRITHJOF ZWILGMEYER.